(12) United States Patent
Sakai

(10) Patent No.: US 11,787,287 B2
(45) Date of Patent: Oct. 17, 2023

(54) VEHICLE DRIVE ASSIST SYSTEM, VEHICLE DRIVE ASSIST METHOD, AND VEHICLE DRIVE ASSIST PROGRAM

(71) Applicant: AISIN CORPORATION, Kariya (JP)

(72) Inventor: Takamitsu Sakai, Nukata (JP)

(73) Assignee: AISIN CORPORATION, Kariya (JP)

( * ) Notice: Subject to any disclaimer, the term of this patent is extended or adjusted under 35 U.S.C. 154(b) by 752 days.

(21) Appl. No.: 16/649,255

(22) PCT Filed: Nov. 16, 2018

(86) PCT No.: PCT/JP2018/042456
§ 371 (c)(1),
(2) Date: Jul. 2, 2020

(87) PCT Pub. No.: WO2019/098323
PCT Pub. Date: May 23, 2019

(65) Prior Publication Data
US 2020/0406747 A1 Dec. 31, 2020

(30) Foreign Application Priority Data
Nov. 17, 2017 (JP) .................................. 2017-222160

(51) Int. Cl.
*B60K 35/00* (2006.01)

(52) U.S. Cl.
CPC ........ *B60K 35/00* (2013.01); *B60K 2370/152* (2019.05); *B60K 2370/166* (2019.05);
(Continued)

(58) Field of Classification Search
CPC .............. B60K 35/00; B60K 2370/152; B60K 2370/166; B60K 2370/176;
(Continued)

(56) References Cited

U.S. PATENT DOCUMENTS

2004/0193347 A1 9/2004 Tarumoto et al.
2006/0164219 A1* 7/2006 Knoll ..................... B60K 35/00
340/435

(Continued)

FOREIGN PATENT DOCUMENTS

JP 2005-056372 A 3/2005
JP 2006-154967 A 6/2006
(Continued)

OTHER PUBLICATIONS

Feb. 12, 2019 Search Report issued in International Patent Application No. PCT/JP2018/042456.

*Primary Examiner* — Adam R Mott
*Assistant Examiner* — Alyzia N Dilworth
(74) *Attorney, Agent, or Firm* — Oliff PLC

(57) ABSTRACT

Vehicle drive assist systems, methods, and programs display an alert image superimposed on a real view on a display. The systems, methods and programs determine a blind spot area, the blind spot area being an area that becomes a blind spot of a driver of a vehicle due to a front obstacle present on a front side in a traveling direction of the vehicle. The alert image is displayed such that the alert image is superimposed on a target point, the target point being a point where traveling of the vehicle is likely to be influenced when there is a moving obstacle jumping out of the blind spot area.

13 Claims, 10 Drawing Sheets

(52) U.S. Cl.
CPC .. *B60K 2370/176* (2019.05); *B60K 2370/178* (2019.05); *B60K 2370/193* (2019.05)

(58) Field of Classification Search
CPC ........ B60K 2370/178; B60K 2370/193; B60K 2370/1529; B60K 2370/177; B60K 2370/194; G01C 21/3694; G08G 1/167; B60R 2300/307; B60R 1/00
See application file for complete search history.

(56) References Cited

U.S. PATENT DOCUMENTS

| | | | |
|---|---|---|---|
| 2013/0010980 A1 | 1/2013 | Yoshioka et al. | |
| 2014/0354684 A1* | 12/2014 | Beckwith | G06F 3/011 345/633 |
| 2016/0003636 A1* | 1/2016 | Ng-Thow-Hing | G06V 20/588 701/418 |
| 2017/0187963 A1 | 6/2017 | Lee et al. | |
| 2017/0262750 A1 | 9/2017 | Kozuka et al. | |
| 2018/0090007 A1* | 3/2018 | Takemori | G08G 1/166 |
| 2018/0231974 A1* | 8/2018 | Eggert | B60W 60/0027 |
| 2018/0322783 A1* | 11/2018 | Toyoda | B60W 40/04 |

FOREIGN PATENT DOCUMENTS

| | | | |
|---|---|---|---|
| JP | 2009-086788 A | | 4/2009 |
| JP | 2011-194979 A | | 10/2011 |
| JP | 2011248870 A | * | 12/2011 |
| JP | 2012-104029 A | | 5/2012 |
| JP | 2017-162438 A | | 9/2017 |
| JP | 2017-182565 A | | 10/2017 |
| WO | 2012/98844 A1 | | 7/2012 |

* cited by examiner

VEHICLE DRIVE ASSIST SYSTEM, VEHICLE DRIVE ASSIST METHOD, AND VEHICLE DRIVE ASSIST PROGRAM

TECHNICAL FIELD

Related technical fields include vehicle drive assist systems, vehicle drive assist methods, and vehicle drive assist programs.

BACKGROUND

For example, JP 2005-056372 A discloses a technique for assisting in traveling while avoiding obstacles present around a vehicle. In the technique of JP 2005-056372 A, areas spreading around an obstacle are displayed so as to be superimposed on a real view on a monitor (502) or on a vehicle's glass, as a dangerous area and a caution area that should be avoided during traveling, (see FIG. 47, paragraph 0273, etc.).

SUMMARY

Meanwhile, in the technique of JP 2005-056372 A, pedestrians, bicycles, other vehicles, etc., are recognized as obstacles, and the above-described dangerous area and caution area are displayed around these obstacles. However, there is also a case in which an obstacle is present at a location that becomes a blind spot of a vehicle, e.g., a corner or behind a large vehicle, and thus a driver of the vehicle needs to pay attention also to the obstacle jumping out of such a blind spot.

Exemplary embodiments of the broad inventive techniques described herein provide a technique capable of calling driver's attention also to a blind spot of a vehicle which is created by an obstacle.

Exemplary embodiments provide vehicle drive assist systems, methods, and programs that display an alert image superimposed on a real view on a display. The systems, methods and programs determine a blind spot area, the blind spot area being an area that becomes a blind spot of a driver of a vehicle due to a front obstacle present on a front side in a traveling direction of the vehicle. The alert image is displayed such that the alert image is superimposed on a target point, the target point being a point where traveling of the vehicle is likely to be influenced when there is a moving obstacle jumping out of the blind spot area.

In addition, technical features of the vehicle drive assist system in view of the above description are also applicable to a vehicle drive assist method and a vehicle drive assist program.

According to these configurations, an alert image is displayed so as to be superimposed on a real view in accordance with a blind spot area of the vehicle which is created by a front obstacle, and thus, for example, it is possible to appropriately call vehicle driver's attention to the possibility of a moving obstacle such as a pedestrian, a bicycle, or another vehicle jumping out of a blind spot.

Further features and advantages of the vehicle drive assist system, the vehicle drive assist method, and the vehicle drive assist program will become apparent from the following description of embodiments which are described with reference to drawings.

DETAILED DESCRIPTION OF EMBODIMENTS

First Embodiment

A first embodiment of a vehicle drive assist system (including a vehicle drive assist method and a vehicle drive assist program) will be described below based on the drawings.

Figure 3:
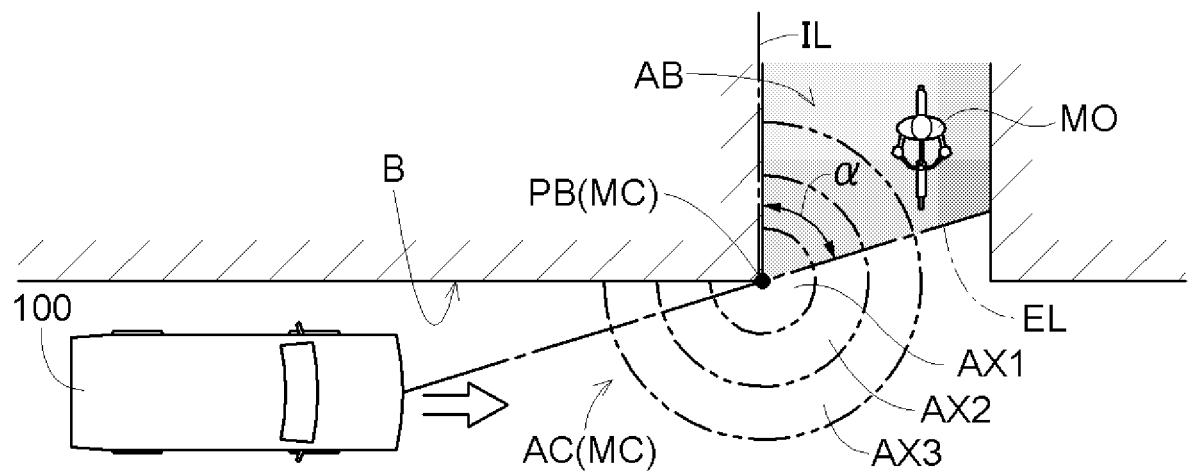
FIG. 3 is a plan view showing a display mode of an alert image for when an obstacle is a structure.

A vehicle drive assist system 10 is a system that provides a driver with information for assisting in driving. In the present embodiment, the vehicle drive assist system 10 displays an alert image (attention call marking) MC superimposed on a real view. For example, the alert image MC serves as a guideline when a driver travels safely. As shown in FIG. 3, the vehicle drive assist system 10 displays an alert image MC superimposed on a real view, and thereby calls driver's attention to a moving obstacle (moving object) MO, such as a pedestrian or a bicycle, jumping out of an area that becomes a blind spot as viewed from the driver (hereinafter, referred to as blind spot area AB).

Here, the blind spot area AB is created behind an obstacle such as a structure or another vehicle as viewed from a vehicle 100, i.e., a front obstacle B present on a front side in a traveling direction of the vehicle 100. That is, the blind spot area AB is an area blocked by the front obstacle B when the front obstacle B is viewed from the vehicle 100. More specifically, the blind spot area AB is an area behind the front obstacle B on an extended line of a line segment connecting the vehicle 100 driven by the driver to the front obstacle B. Here, the front obstacle B that creates the blind spot area AB includes a structure such as a building or a wall, another vehicle that is traveling or being parked, etc. Note, however, that the front obstacle B is not limited thereto, and includes all objects that can create the blind spot area AB.

Note that the vehicle drive assist method is a method for providing driving assistance by using, for example, hardware and software that form the vehicle drive assist system 10 such as those which will be described later with reference to FIG. 2, etc. Note also that the vehicle drive assist program is a program that is executed on, for example, a computer (e.g., an arithmetic processing unit 4 which will be described later with reference to FIG. 2) included in the vehicle drive assist system 10, to implement a vehicle driving assistance function.

Figure 1:
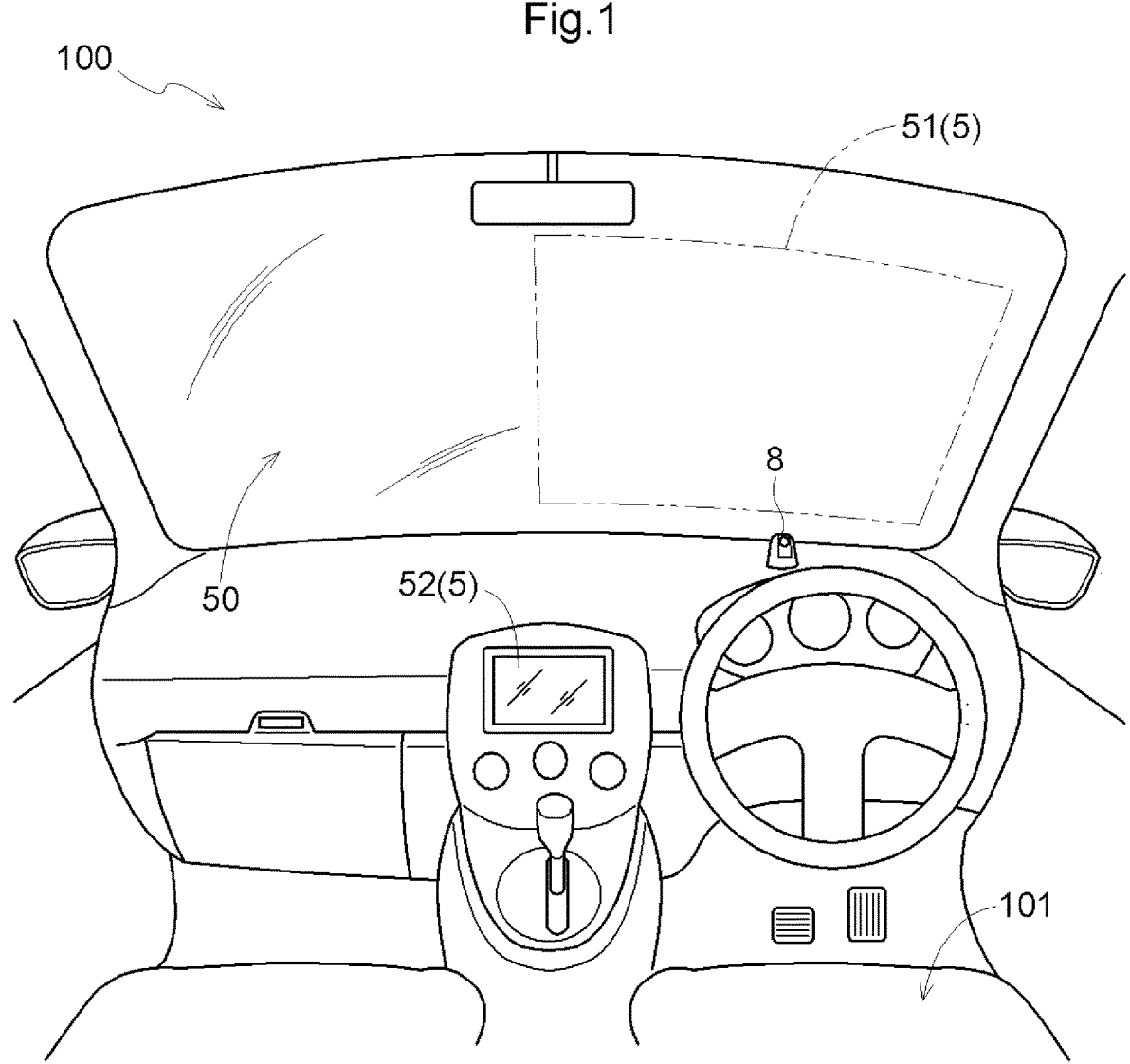
FIG. 1 is a perspective view showing an example of an area near a driver's seat of a vehicle.

As shown in FIG. 1, a real view on which an alert image MC is superimposed may be a view seen from a driver's seat 101 through a windshield 50 of the vehicle 100, or may be video that is captured by an imaging part (in this example, a front camera 1: see FIG. 2) which will be described later, and shown on a monitor 52. When the real view is a view seen through the windshield 50, the alert image MC is, for example, rendered on a head-up display 51 which is formed on the windshield 50, and superimposed on the real view. A dashed-line area shown in the windshield 50 in FIG. 1 is an area in which the head-up display 51 is formed. In addition, when the real view is video shown on the monitor 52, the alert image MC is superimposed on the video.

Figure 2:
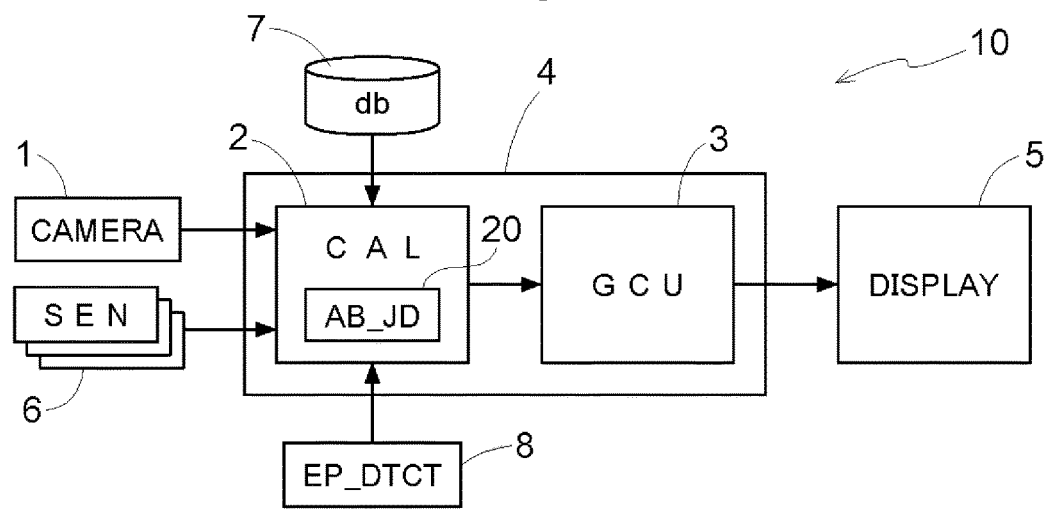
FIG. 2 is a block diagram schematically showing an example of a system configuration of a vehicle drive assist system.

As shown in FIG. 2, the vehicle drive assist system 10 includes the front camera 1 (CAMERA) that captures an image of a real view; and a display device 5 (corresponding to a display part: DISPLAY) that displays an alert image MC superimposed on the real view. In the present embodiment, the vehicle drive assist system 10 further includes an arithmetic processing device 2 (CAL) and a graphic control unit 3 (GCU). For example, the arithmetic processing device 2 and the graphic control unit 3 are formed as a single processor (a system LSI, a digital signal processor (DSP), etc.) or as a part of the arithmetic processing unit 4 which is formed as a single electronic control unit (ECU). The vehicle drive assist system 10 includes a blind spot area determining part 20 (AB_JD) that determines a blind spot area AB which is an area that becomes a blind spot of the driver of the vehicle 100 due to a front obstacle B present on a front side in a traveling direction of the vehicle 100. In an example shown in the drawing, the blind spot area determining part 20 is a functional part of the arithmetic processing device 2. Note that, as a matter of course, the arithmetic processing unit 4 may include other functional parts which are not shown. Note also that the display device 5 includes the above-described head-up display 51 and monitor 52.

In the present embodiment, the vehicle drive assist system 10 further includes a sensor group 6 (a detecting part: SEN), a database 7 (a storage part: db), and an eyepoint detection device 8 (EP_DTCT). The sensor group 6 can include sonar, radar, a vehicle speed sensor, a yaw-rate sensor, a global positioning system (GPS) receiver, etc. (As used herein, the term "storage medium" does not encompass transitory signals.)

The database 7 includes a navigation database, and stores map information, road information, ground object information (information on traffic signs, road markings, facilities, etc.), etc. In the present embodiment, in the database 7 there is stored, as road environment parameters Penv, road environment information such as automobile roads, suburban areas, city areas, and downtown areas which serves as road information. In addition to them, in the database 7 there is stored information on the types of front obstacles B, as obstacle parameters Pobs. In the present embodiment, as the types of front obstacles B, information such as structures, e.g., buildings and walls, oncoming vehicles, and vehicles being parked on streets (hereinafter, referred to as parked vehicles) is stored in the database 7.

The eyepoint detection device 8 is configured to include, for example, a camera that captures an image of a driver's head, and detects a driver's eyepoint (eyes). It is preferable that an alert image MC rendered on the head-up display 51 be rendered at a location appropriate to the driver's eyepoint.

The vehicle drive assist system 10 further includes an imaging part that captures an image of an area on a front side in a traveling direction of the vehicle 100, and in an example shown in the drawing, the imaging part is formed as the front camera 1. The arithmetic processing device 2 identifies a front obstacle B present around the vehicle 100 by image recognition that uses a captured image obtained by the front camera 1 (see FIG. 3, etc.). For example, front obstacles B to be identified include pedestrians, bicycles, traffic signs, utility poles, and other objects present on a road, in addition to the above-described structures, other vehicles, etc. Note that in the present embodiment the arithmetic processing device 2 is configured to identify one or a plurality of front obstacles B. For example, the arithmetic processing device 2 may be able to improve recognition accuracy by also using information provided from the sensor group 6 such as sonar and radar, in addition to captured images.

Then, the arithmetic processing device 2 determines whether the identified front obstacle B corresponds to an object that creates a blind spot area AB to which driver's attention should be called. More specifically, the arithmetic processing device 2 determines whether the size of the identified front obstacle B is less than or equal to a preset threshold value T. Such a determination can be made by the blind spot area determining part 20 included in the arithmetic processing device 2. In the present embodiment, the display device 5 (display part) is configured not to display an alert image MC when the size of the front obstacle B is less than or equal to the preset threshold value T (see FIG. 11). For example, when the front obstacle B is a pedestrian, a bicycle, a traffic sign, a utility pole, or the like, it is considered that a blind spot area AB is not created in an area behind the front obstacle B, or even if a blind spot area AB has created, the blind spot area AB is sufficiently small. Hence, it is unlikely that a moving obstacle MO such as another pedestrian or bicycle is present in such a blind spot area AB. In addition, if an alert image MC appropriate to a blind spot area AB is displayed even in a case of a low (or very low) possibility of occurrence of a moving obstacle MO in the blind spot area AB, then the driver may feel annoyed. Hence, as in the above-described configuration, by not displaying an alert image MC when the size of a front obstacle B is less than or equal to the threshold value T, an unnecessary call for driver's attention is avoided as much as possible so that driver's attention can be appropriately called.

The arithmetic processing device 2 calculates the size of a blind spot area AB created by a front obstacle B, and creates an alert image MC based on the size of the blind spot area AB. Then, for example, as shown in FIG. 3, the display device 5 displays the alert image MC superimposed on a target point PB which is a point where the traveling of the vehicle 100 is likely to be influenced when there is a moving obstacle MO jumping out of the blind spot area AB. In the present embodiment, the target point PB is a base point of creation of the blind spot area AB. The alert image MC has a display area AC that is represented so as to be appropriate to the blind spot area AB of the vehicle 100 which is created by the front obstacle B, and that spreads around from the base point of creation (target point PB) of the blind spot area AB. Here, the alert image MC includes the target point PB and the display area AC. Namely, in this example, as shown in FIG. 3, etc., the alert image MC is an image having an area including the target point PB, and is displayed at least within a travel lane of the vehicle 100 in front in the traveling direction of the vehicle 100.

Figure 10:
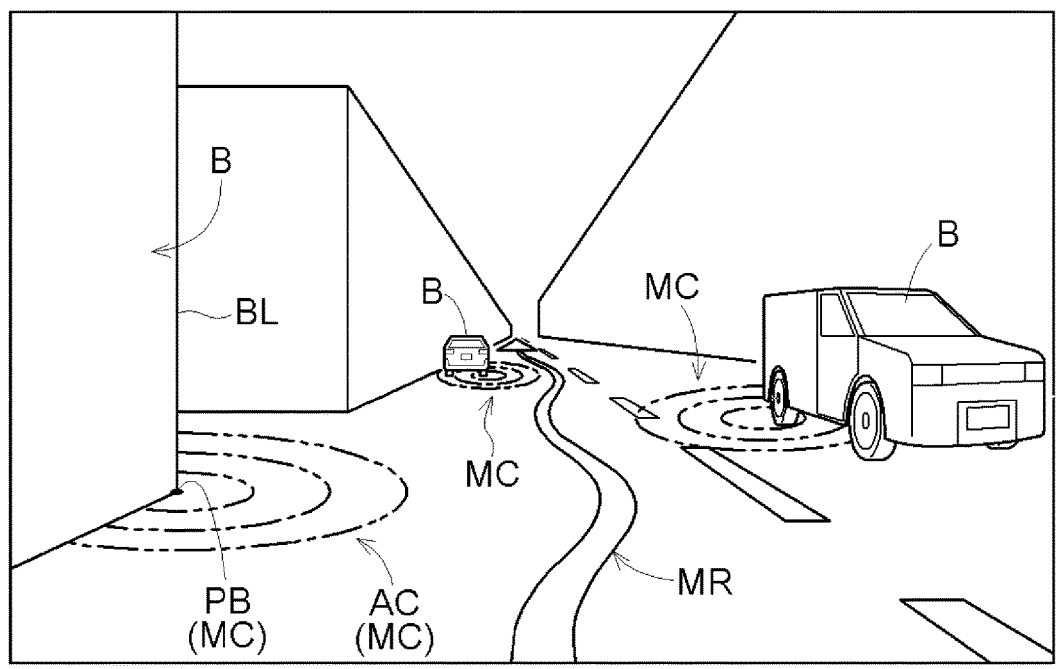
FIG. 10 is a diagram showing a state in which an alert image and a recommended route image are superimposed on a real view.

For example, as shown in FIG. 10, in this example, a base point of creation of a blind spot area AB which is a target point PB is a point indicating an edge portion of a front obstacle B and representing a boundary BL between the blind spot area AB created by the front obstacle B and an area that can be visually identified by the driver of the vehicle 100. In the present embodiment, for example, as shown in FIG. 10, the target point PB is a point of intersection of the boundary BL between the blind spot area AB and the area that can be visually identified by the driver of the vehicle 100 or an extended line of the boundary BL and the ground. A display area AC is set so as to spread from the target point PB to at least the area that can be visually identified by the driver. Note that in the present embodiment the area that can be visually identified by the driver refers to an area that is not blocked by the front obstacle B, i.e., an area other than the blind spot area AB.

As shown in FIGS. 3 to 8, in the present embodiment, the size of a blind spot area AB is determined based on a reference angle (angle), in a planar view, of the blind spot area AB spreading out behind a front obstacle B as viewed from the driver of the vehicle 100, with a base point of creation (target point PB) of the blind spot area AB being at the center. In this example, the blind spot area determining part 20 (see FIG. 2) determines the size of the blind spot area AB based on the reference angle. For example, in FIG. 3, the reference angle is represented by "α". In this example, the reference angle refers to an angle formed, in a planar view, by an extended line of a line segment that connects the vehicle 100 to the target point PB (hereinafter, simply referred to as extended line EL) and a line that goes in a direction orthogonal to the traveling direction of the vehicle 100 and that extends from the target point PB to a side that moves away from the vehicle 100 (hereinafter, referred to as intersection line IL) with the target point PB being at the center. The intersection line IL is always constant. On the other hand, the inclination of the extended line EL varies depending on a relative position of the vehicle 100 to the target point PB. Therefore, the reference angle varies by the movement of the vehicle 100, and the size of the blind spot area AB also varies depending on the variation in the reference angle.

Figure 4:
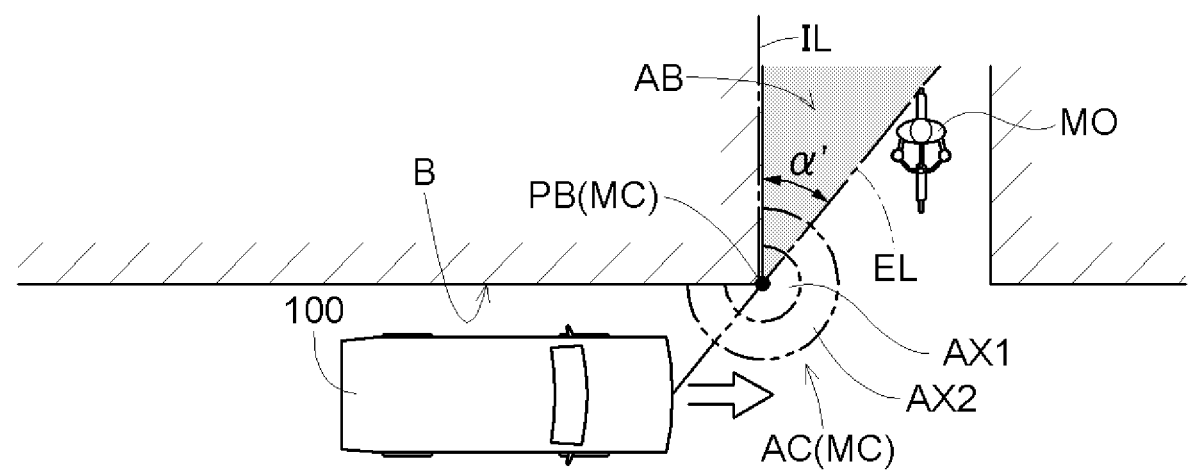
FIG. 4 is a plan view showing a display mode of an alert image for when an obstacle is a structure.

As the vehicle 100 approaches the front obstacle B that creates the blind spot area AB, the extended line EL is inclined more toward an intersection line IL side, and the reference angle gradually decreases. For example, FIG. 3 shows a relative positional relationship between the vehicle 100 and the target point PB in a planar view for when the front obstacle B is a structure. FIG. 4 shows a relative positional relationship between the vehicle 100 and the target point PB at a later point in time than in FIG. 3 (e.g., a few seconds later). At the position of the vehicle 100 in FIG. 3, the reference angle is α. In FIG. 4, the vehicle 100 has further approached the target point PB than in a state of FIG. 3, and the reference angle is α' which is smaller than α. Therefore, the blind spot area AB is smaller in the state of FIG. 4 over the state of FIG. 3. In this manner, the size of the blind spot area AB changes depending on the relative positional relationship between the vehicle 100 and the target point PB (front obstacle B).

Figure 5:
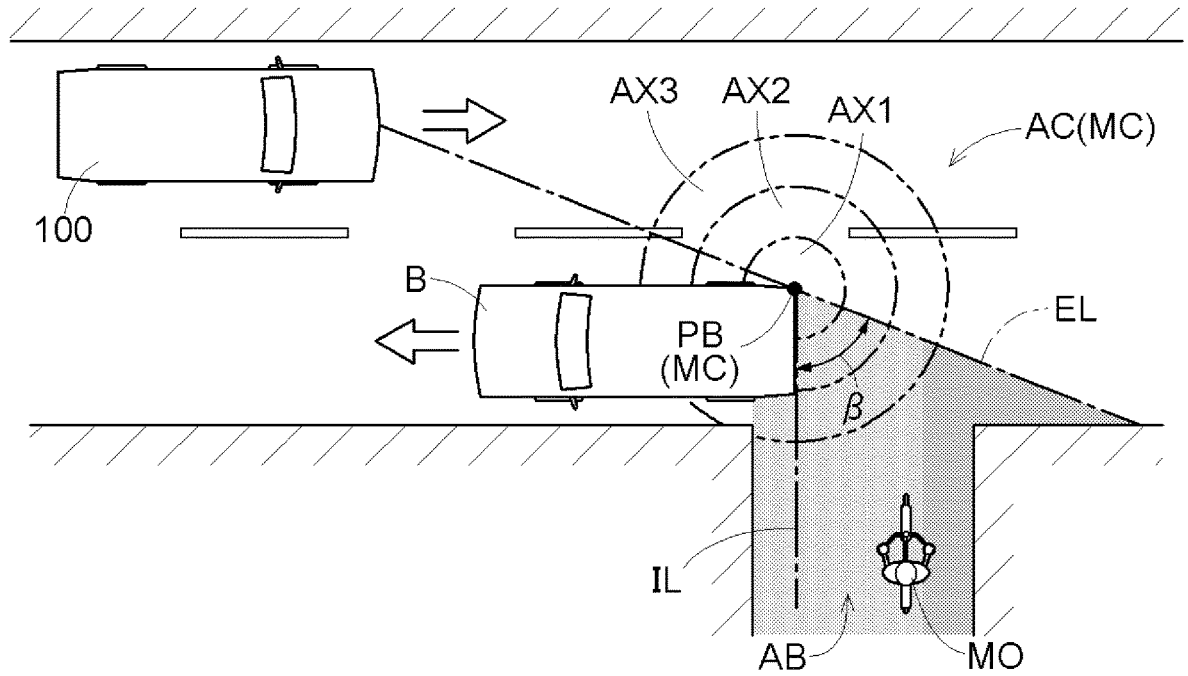
FIG. 5 is a plan view showing a display mode of an alert image for when an obstacle is an oncoming vehicle.
Figure 6:
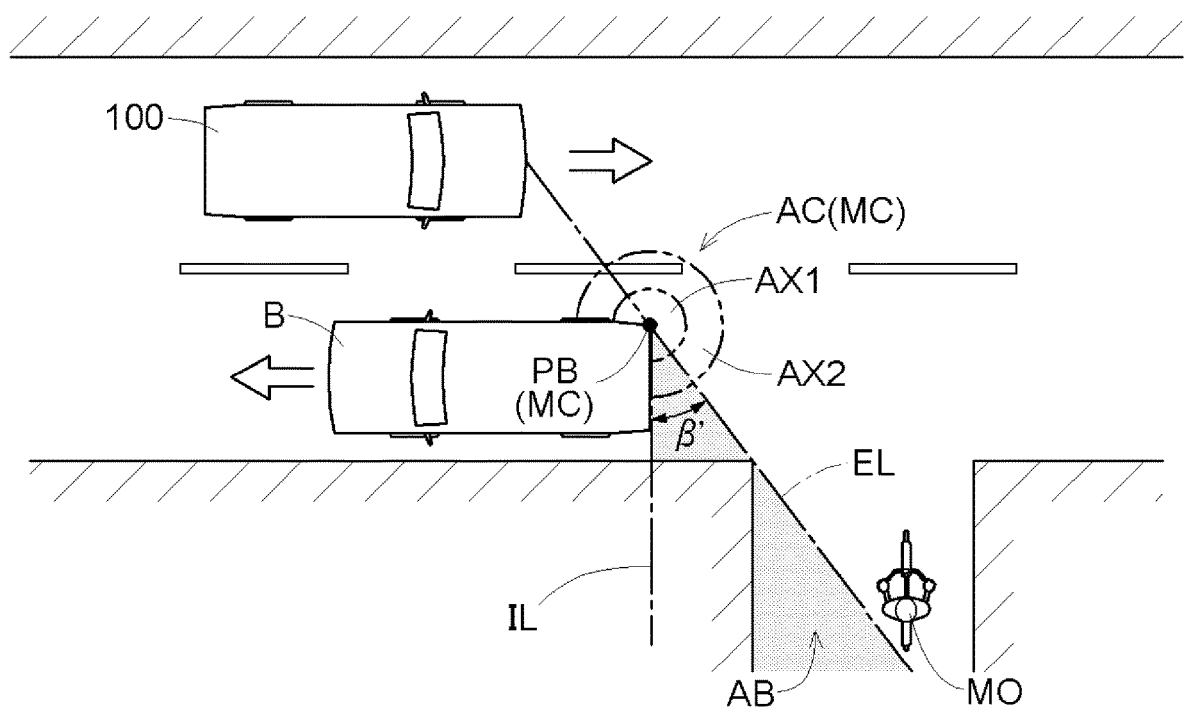
FIG. 6 is a plan view showing a display mode of an alert image for when an obstacle is an oncoming vehicle.

In addition, for example, FIG. 5 shows a relative positional relationship between the vehicle 100 and a target point PB in a planar view for when a front obstacle B is an oncoming vehicle. FIG. 6 shows a relative positional relationship between the vehicle 100 and the target point PB at a later point in time than in FIG. 5 (e.g., a few seconds later). At the position of the vehicle 100 in FIG. 5, the reference angle is β. In FIG. 6, the vehicle 100 has further approached the target point PB than in a state of FIG. 5, and the reference angle is β' which is smaller than β. Therefore, a blind spot area AB is smaller in the state of FIG. 6 over the state of FIG. 5. Note that in the example shown in FIGS. 5 and 6, an edge portion on the right side rear of the oncoming vehicle B serves as the target point PB with reference to a traveling direction of the oncoming vehicle B. However, for example, when the oncoming vehicle B is leaning to the vehicle 100 due to a curved road, etc., an edge portion on the right side front of the oncoming vehicle B can serve as an edge portion of the oncoming vehicle B in a driver's visually identifiable range. In this case, the edge portion on the right side front of the oncoming vehicle B is recognized as a target point PB.

Figure 7:
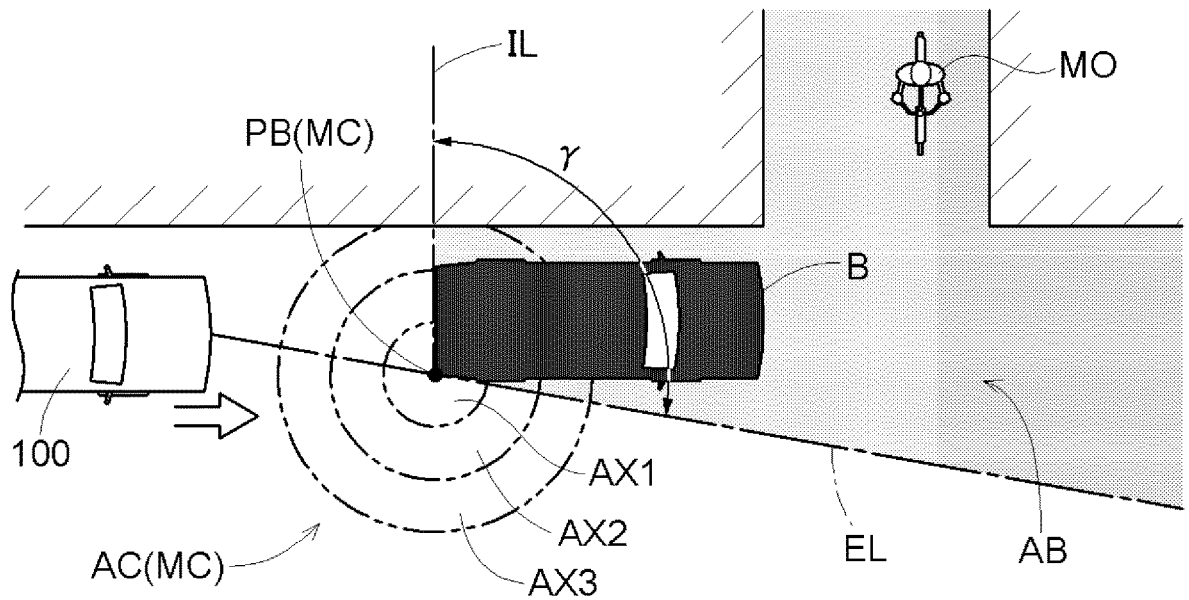
FIG. 7 is a plan view showing a display mode of an alert image for when an obstacle is a parked vehicle.
Figure 8:
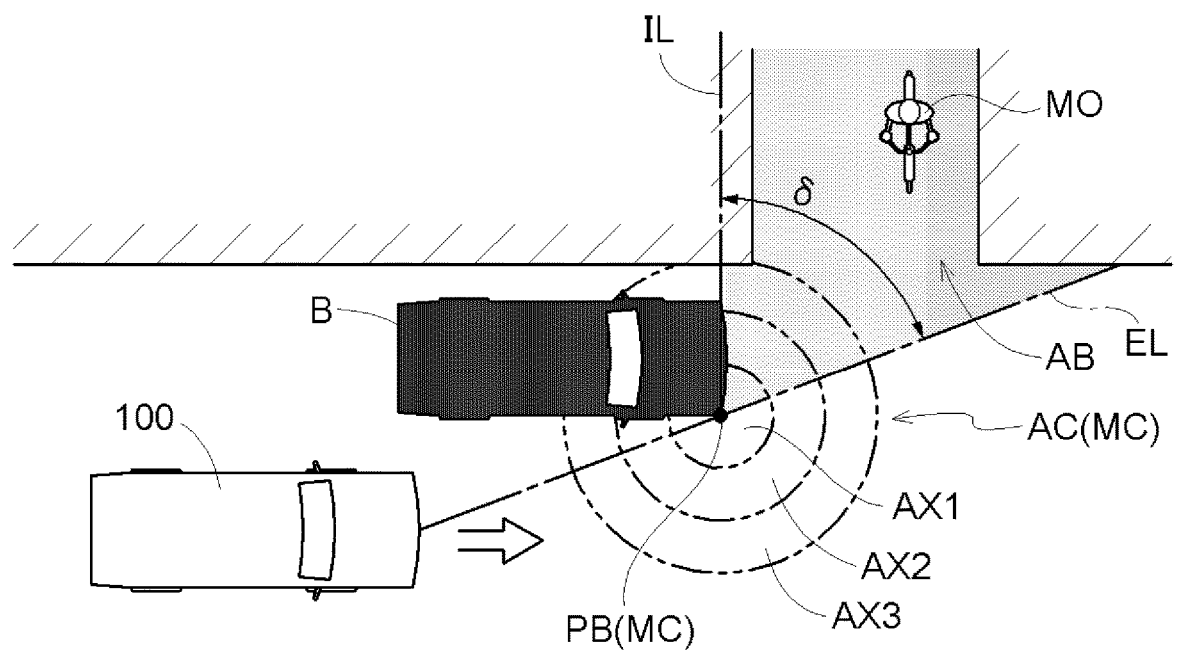
FIG. 8 is a plan view showing a display mode of an alert image for when an obstacle is a parked vehicle.

In addition, for example, FIG. 7 shows a relative positional relationship between the vehicle 100 and a target point PB in a planar view for when a front obstacle B is a parked vehicle. FIG. 8 shows a relative positional relationship between the vehicle 100 and a target point PB at a later point in time than in FIG. 7 (e.g., a few seconds later). At the position of the vehicle 100 in FIG. 7, an edge portion on the right side rear of the parked vehicle B is recognized as a target point PB, and the reference angle formed with the target point PB being at the center is γ. At the position of the vehicle 100 in FIG. 8, an edge portion on the right side front of the parked vehicle B is recognized as a target point PB, and the reference angle formed with the target point PB being at the center is δ. In this example, between a state shown in FIG. 7 and a state shown in FIG. 8, the position of the target point PB changes when the eyepoint of the vehicle 100 (the driver or the front camera 1) moves to more on the right side than a side of the parked vehicle B. Note that, though not shown, the reference angle decreases as the vehicle 100 approaches each target point PB shown in FIGS. 7 and 8, and their blind spot areas AB also decrease.

In the present embodiment, in an alert image MC, the size of a display area AC changes based on the size of a blind spot area AB that changes depending on a relative positional relationship between the vehicle 100 and a target point PB. In this example, as shown in FIGS. 3 to 6, the display area AC of the alert image MC on the real view decreases as the blind spot area AB decreases. At this time, the display area AC may be displayed so as to continuously decrease as the blind spot area AB decreases, or may be displayed so as to decrease in a stepwise manner as the blind spot area AB decreases. In this example, in the arithmetic processing device 2, the graphic control unit 3 displays an alert image MC on the display device 5 such that the alert image MC is superimposed on a real view. For example, the arithmetic processing device 2 may be able to allow the graphic control unit 3 to improve the accuracy of a location at which an alert image MC is superimposed, by obtaining map information, etc., from the database 7.

Note that the above description describes an example in which a display area AC of an alert image MC on a real view decreases as a blind spot area AB decreases. However, the display area AC may decrease in accordance with other criteria. For example, the display area AC of the alert image MC on the real view may decrease as the vehicle 100 approaches the blind spot area AB. Namely, in this example, the size of the display area AC of the alert image MC changes based on a distance between the vehicle 100 and the blind spot area AB. Note, however, that even in this example, as in the above description, the blind pot area AB decreases as the vehicle 100 approaches the blind spot area AB, and the blind spot area AB increases as the vehicle 100 moves away from the blind spot area AB, and thus, it can also be said that the size of the display area AC of the alert image MC changes based on a change in the size of the blind spot area AB.

In addition, in the present embodiment, an attention call level X of an alert image MC is set to a lower value as a blind spot area AB decreases. In other words, the attention call level X of the alert image MC is set to a higher value as the blind spot area AB increases.

In this example, the attention call level X represents the level of a call for vehicle 100's (driver's) attention. In the present embodiment, the alert image MC is displayed in a mode in which the attention call level X for the vehicle 100 is shown in a stepwise manner. The attention call level X is visually shown in the display area AC. For example, as shown in FIG. 3, etc., the attention call level X is displayed in a mode in which the display area AC is divided into a plurality of circular areas having different diameters with the target point PB being at the center. In this case, a higher attention call level X is set for an area closer to the target point PB. In an example shown in the drawing, a first alert area AX1, a second alert area AX2, and a third alert area AX3 are displayed in order from closest to the target point PB, as areas indicating the attention call level X. A high attention call level X is set in the order of the first alert area AX1, the second alert area AX2, and the third alert area AX3. For example, the first to third alert areas AX1 to AX3 are displayed using different colorations, patterns, etc. Note that the "colorations" as used herein include not only colors and chromas, but also shades. In this case, it is preferable that the colorations of the first to third alert areas AX1 to AX3 be, for example, colorations that call more attention for a higher attention call level X, based on cognitive engineering, etc. For example, compared to white and yellow, orange and red generally remind the driver of the necessity for attention. Alternatively, it is also preferable that the shade or chroma increase as the attention call level X increases. In addition, the first to third alert areas AX1 to AX3 may be displayed three-dimensionally (e.g., a pyramidal shape) and in different heights. In this case, display is provided in a mode in which the display height increases as the attention call level X increases (as the vehicle 100 approaches the target point PB). By thus making the display mode of the alert image MC different by a coloration, a pattern, a shape, etc., it becomes possible to intuitively show the driver a portion with a high (or low) attention call level X.

In addition, in the present embodiment, the display mode of the alert image MC varies depending on a road environment in which the vehicle 100 travels. Specifically, the display mode of the alert image MC is set based on a road environment such that the attention call level X increases as the possibility of a moving obstacle MO jumping out of the blind spot area AB increases. For example, it is preferable that a road environment be classified into four types: downtown areas, city areas, suburban areas, and automobile roads, and the display mode be set such that those described earlier have a higher attention call level X than those described later. At this time, it is preferable that as described above, the display mode of the alert image MC be made different by a coloration, a pattern, a shape, etc. In addition, when, as described above, the display area AC of the alert image MC is divided into a plurality of areas like the first to third alert areas AX1 to AX3, it is preferable that the attention call level X of each of the plurality of areas be increased by a certain level.

Furthermore, in the present embodiment, the display mode of the alert image MC varies depending on the type of a front obstacle B that creates a blind spot area AB. Specifically, the display mode of the alert image MC is set based on the type of a front obstacle B that creates a blind spot area AB, such that the attention call level X increases as the possibility of a moving obstacle MO jumping out of the blind spot area AB increases. For example, it is preferable that front obstacles B be classified into three types: structures, e.g., buildings and walls, parked vehicles, and oncoming vehicles (see FIGS. 3 to 8), and the display mode be set such that those described earlier have a higher attention call level X than those described later. At this time, it is preferable that as described above, the display mode of the alert image MC be made different by a coloration, a pattern, a shape, etc. In addition, when, as described above, the display area AC of the alert image MC is divided into a plurality of areas like the first to third alert areas AX1 to AX3, it is preferable that the attention call level X of each of the plurality of areas be increased by a certain level.

Note that in addition to the above description, the configuration may be such that a coloration, a pattern, a shape, etc., change based on the type of a front obstacle B, irrespective of the attention call level X. For example, the configuration may be such that depending on the type of a front obstacle B, the coloration system varies depending on the type of a front obstacle B, e.g., a structure is a red system and a parked vehicle is a blue system, by which the driver of the vehicle 100 is aware of different front obstacles B. In addition, a display mode in which the alert image MC does not vary depending on the type of a front obstacle B may be adopted.

In the above-described manner, the vehicle drive assist system 10 displays an alert image MC superimposed on a real view.

Figure 9:
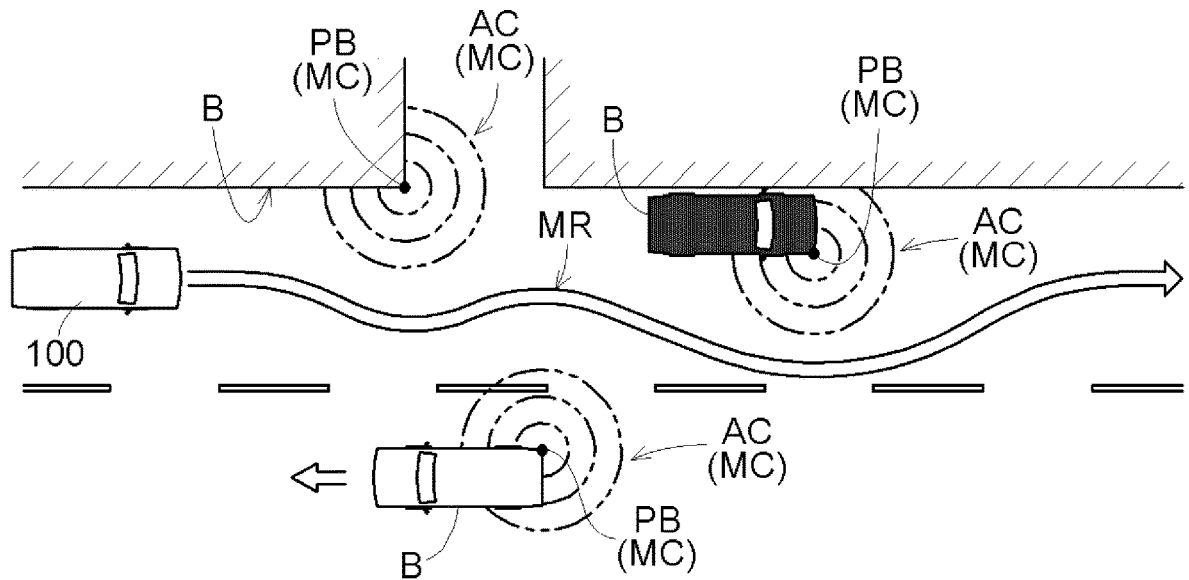
FIG. 9 is a plan view showing a display mode of a recommended route image.

As shown in FIG. 9, in the present embodiment, the display part 5 (display device) is configured to further display a recommended route image MR (recommended route marking) representing a recommended route which is a traveling route recommended for the vehicle 100 (driver), such that the recommended route image MR is superimposed on a real view. In this example, the recommended route image MR is displayed so as to go around target points PB. In an example shown in the drawing, the recommended route image MR is continuously displayed so as to go around one or a plurality of alert images MC. Note, however, that the configuration is not limited thereto, and the recommended route image MR may be intermittently displayed.

When the arithmetic processing device 2 identifies a target point PB of a blind spot area AB, the arithmetic processing device 2 calculates a recommended route so as to go around the target point PB. In other words, the arithmetic processing device 2 calculates a route with a relatively low likelihood of interference with a moving obstacle MO when the moving obstacle MO jumps out of the blind spot area AB. Hence, in the present embodiment, a recommended route is calculated such that even when the recommended route overlaps a display area AC, the recommended route overlaps an area with a low attention call level X as much as possible, so as to minimize the overlapping of the recommended route with the display area AC of an alert image MC. At this time, it is also preferable that map information, etc., be obtained from the database 7 and a recommended route be calculated taking also into account a road width, whether there is an intersection, etc. In addition to a recommended route image, a recommended speed image representing a recommended speed which is a traveling speed recommended for the vehicle 100 may be displayed so as to be superimposed on a real view. The recommended speed is also calculated by the arithmetic processing device 2.

The arithmetic processing device 2 calculates costs related to traveling in a range in which the vehicle 100 can travel in a traveling direction (e.g., on a road). For example, the cost is higher for a location closer to a target point PB, and the cost is lower for a location further away from the target point PB. In addition, a destination on a traveling route is set in a range of a captured image, and the cost of the destination is set to the lowest value (e.g., zero). For example, it is preferable that the costs be calculated using potential functions which will be described later.

The arithmetic processing device 2 can calculate a recommended route by calculating the shortest course that passes through low-cost points from a current location to a destination. In this calculation method, a route in directions with low costs is calculated, and thus, a calculation load becomes comparatively light. Note that there is also a case in which there are a large number of front obstacles B (target points PB) that create blind spot areas AB and thus it is better for the vehicle 100 to stop. To handle such a case, it is preferable that an upper limit of costs at which a route can be shut down be also set.

Although description is simply made above, for a technique for thus performing autonomous operation while avoiding target points PB in a three-dimensional space, there is known, for example, a potential method. The potential method is publicly known and thus a detailed description thereof is omitted, but, for example, by defining potential functions for a current value, a target location (destination), and a target point PB and setting a gradient of the potential functions as a traveling direction, a recommended route can be calculated. Note that the gradient can be found by a partial derivative for each coordinate component (e.g., for each of x-, y-, and z-axes in a three-dimensional Cartesian coordinate system). A potential gradient to the target value acts in an attractive direction, and a traveling direction of the recommended route goes toward the target value. On the other hand, a potential gradient of the target point PB acts in a repulsive direction, and the recommended route is set so as to avoid the target point PB. The potential functions can be updated in real time based on observation information (captured images, results of detection by the sensor group 6, etc.), by which an appropriate recommended route at each point in time can be calculated.

FIG. 10 shows an example in which alert images MC and a recommended route image MR are superimposed on the same real view as that of FIG. 9. Though not shown, in addition to them, the above-described recommended speed image may be displayed so as to be superimposed on the real view. In addition, as described above, video shown in FIG. 10 is displayed on the head-up display 51, the monitor 52, or the like.

Next, a procedure of driving assistance provided by the vehicle drive assist system 10 will be described with reference to flowcharts of FIGS. 11 to 13.

Figure 11:
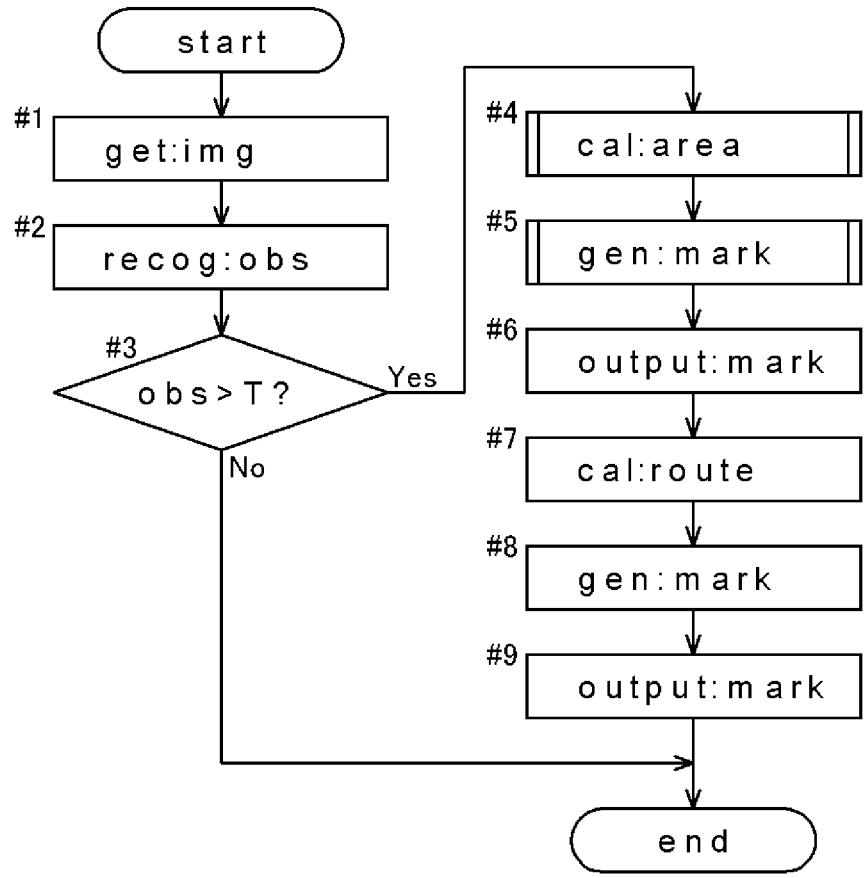
FIG. 11 is a flowchart showing a procedure of driving assistance.

As shown in FIG. 11, the vehicle drive assist system 10 first obtains a captured image of a view in a traveling direction of the vehicle 100 which is captured by the front camera 1 (#1: a captured image obtaining step and a captured image obtaining function). The vehicle drive assist system 10 then recognizes an image of a front obstacle B from the captured image (#2: an obstacle recognizing step and an obstacle recognition function). At this time, the front obstacle B to be recognized by the vehicle drive assist system 10 is a structure, another vehicle, a pedestrian, a bicycle, a traffic sign, a utility pole, and any other object present on a road. As described above, the front obstacle B is not limited to being subjected to image recognition, and may be detected also using other methods that use results of detection by the sensor group 6. Therefore, the obstacle recognizing step can also be referred to as obstacle detecting step.

Then, the vehicle drive assist system 10 determines whether the size of the recognized front obstacle B is larger than a preset threshold value T (#3: an obstacle determining step and an obstacle determination function). If it is determined that the recognized front obstacle B is less than or equal to the threshold value T (#3; No), the vehicle drive assist system 10 considers that a moving obstacle MO such as a pedestrian or a bicycle is less likely to be present in an area behind the front obstacle B, and thus does not display an alert image MC for the front obstacle B.

If it is determined that the recognized front obstacle B is larger than the threshold value T (#3; Yes), the vehicle drive assist system 10 calculates the size of a blind spot area AB which is currently created by the front obstacle B (#4: a blind spot area calculating step and a blind spot area calculation function).

In this example, the blind spot area calculating step #4 is performed by the blind spot area determining part 20 (see FIG. 2). Therefore, the blind spot area calculating step #4 (blind spot area calculation function) can also be referred to as blind spot area determining step #4 (blind spot area determining step). Here, the blind spot area calculating step #4 is performed, for example, according to a procedure shown in a flowchart of FIG. 12. First, the vehicle drive assist system 10 recognizes a target point PB from the captured image obtained by the front camera 1 (#41: a target point recognizing step and a target point recognition function). Then, the vehicle drive assist system 10 finds a traveling direction of the vehicle 100 by image recognition in the captured image obtained by the front camera 1, and finds an extension direction of an extended line EL that connects (the eyepoint of) the vehicle 100 to a boundary BL (target point PB) serving as an edge portion of the front obstacle B (see FIGS. 3 to 8) (#42: an image recognizing step and an image recognition function). Based on them, the vehicle drive assist system 10 calculates a reference angle formed by the extended line EL and an intersection line IL (see FIGS. 3 to 8) (#43: a reference angle calculating step and a reference angle calculation function). Then, the vehicle drive assist system 10 decides the size of a blind spot area AB, based on the calculated reference angle (#44: a blind spot area deciding step and a blind spot area decision function). In this manner, the size of the blind spot area AB is calculated (#4).

As shown in FIG. 11, after the vehicle drive assist system 10 calculates the size of the blind spot area AB, the vehicle drive assist system 10 creates an alert image MC, based on the size of the current blind spot area AB, a road environment, the type of the front obstacle B, etc. (#5; an alert image creating step and an alert image creation function).

Figure 13:
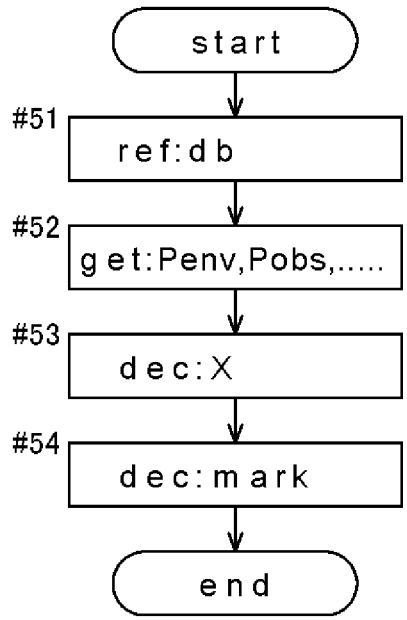
FIG. 13 is a flowchart showing a procedure for a case of creating an alert image.

Here, the alert image creating step #5 is performed, for example, according to a procedure shown in a flowchart of FIG. 13. First, the vehicle drive assist system 10 refers to the database 7 that stores, as parameters, information about road environments, the types of front obstacles B, etc. (#51), and thereby obtains various types of parameters such as a road environment parameter Penv and an obstacle parameter Pobs (#52: a parameter obtaining step and a parameter obtaining function). Then, the vehicle drive assist system 10 decides an attention call level X, based on the parameters (#53: an attention call level deciding step and an attention call level decision function). When a display area AC of an alert image MC is divided into a plurality of areas like the first to third alert areas AX1 to AX3, call attention levels X of the respective plurality of areas are decided. Thereafter, the vehicle drive assist system 10 decides an alert image MC (specifically, a display mode of an alert image MC) based on the decided attention call levels X (#54: an alert image deciding step and an alert image decision function). In this manner, the alert image MC is created (#5).

As shown in FIG. 11, after the vehicle drive assist system 10 creates the alert image MC, the vehicle drive assist system 10 outputs the created alert image MC to the display device 5 to display the alert image MC (#6; an alert image displaying step and an alert image display function). Thereafter, the vehicle drive assist system 10 calculates a recommended route which is a traveling route recommended for the vehicle 100 (#7: a recommended route calculating step and a recommended route calculation function). Then, the vehicle drive assist system 10 creates a recommended route image MR, based on the calculated recommended route (#8; a recommended route image creating step and a recommended route image creation function), and outputs the created recommended route image MR to the display device 5 to display the recommended route image MR (#9: a recommended route image displaying step and a recommended route image display function).

Second Embodiment

Next, a second embodiment of a vehicle drive assist system (including a vehicle drive assist method and a vehicle drive assist program) will be described. The second embodiment differs from the above-described first embodiment in a determination mode of a blind spot area AB and a display mode of an alert image MC displayed so as to be superimposed on a real view. The following mainly describes configurations of the second embodiment that differ from those of the above-described first embodiment. Matters that are not particularly described are the same as those of the above-described first embodiment.

Figure 14:
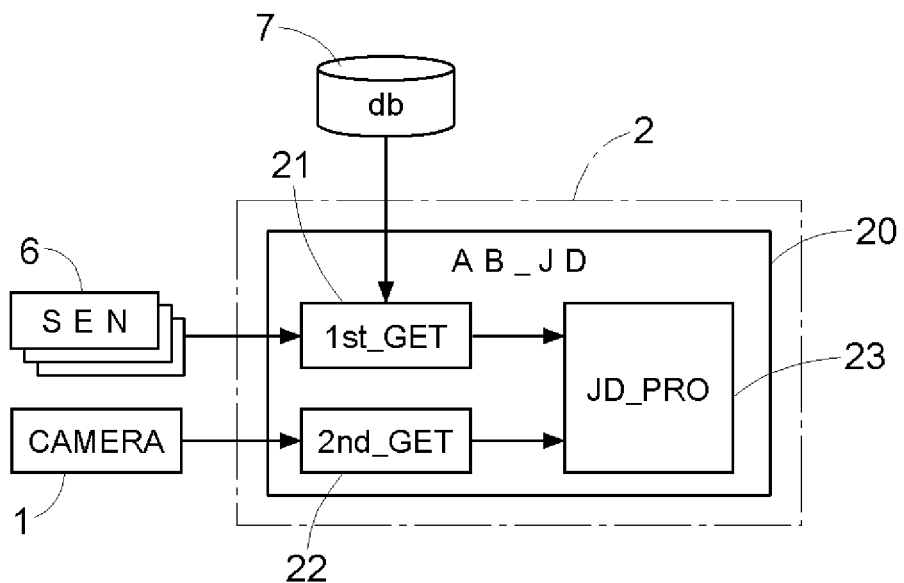
FIG. 14 is a block diagram schematically showing a part of a system configuration of a vehicle drive assist system according to a second embodiment.

FIG. 14 schematically shows a part of a system configuration (see FIG. 2) of a vehicle drive assist system 10 according to the present embodiment. As shown in FIG. 14, in the present embodiment, a blind spot area determining part 20 includes a first area information obtaining part 21 (1st_GET) that obtains first area information which is information indicating an ideal road surface area of a target road RT for when there is no front obstacle B, the target road RT being a road on which a blind spot area AB is formed (see FIG. 16, etc.); a second area information obtaining part 22 (2nd_GET) that obtains second area information which is information indicating a road surface area of the target road RT which is included in image information captured by the imaging part (front camera 1); and a determination processing part 23 (JD_PRO) that determines the location and size of the blind spot area AB, based on the first area information and the second area information.

Here, the "information indicating a road surface area" is information indicating the location, size, shape, etc., of the road surface area. The "location, size, and shape of the road surface area" may be information obtained with reference to image information captured by the front camera 1 or other imaging means, or may be information obtained with reference to road information (map information) stored in the database 7. Alternatively, the "location, size, and shape of the road surface area" may be information obtained with reference to other eyepoints. In this example, information indicating a road surface area is included in road information stored in the database 7. Of these pieces of information, information indicating an ideal road surface area of a target road RT for when there is no front obstacle B is the above-described first area information.

In the present embodiment, the first area information obtaining part 21 identifies a current vehicle location (the location of the vehicle 100) by the sensor group 6, and obtains first area information about a target road RT present around the vehicle location from the database 7. Alternatively, the first area information obtaining part 21 may be configured to calculate and obtain first area information, based on vehicle location information obtained from the sensor group 6 and road information obtained from the database 7. Note, however, that the configuration is not limited to that described above, and the first area information obtaining part 21 may be configured to obtain first area information based on image information captured by the front camera 1 and by, for example, arithmetic processing, e.g., a road edge line in a captured image is extended.

In the present embodiment, the second area information obtaining part 22 obtains second area information, based on a road surface area that can be recognized in a captured image which is captured by the front camera 1. Namely, the second area information is information indicating a road surface area in a range in which the road surface area can be identified in the captured image of the front camera 1. Therefore, a road surface area indicated by second area information may be narrower (cannot be at least wider) than an ideal road surface area for when there is no front obstacle B which is indicated by first area information.

The determination processing part 23 obtains the first area information from the first area information obtaining part 21 and obtains the second area information from the second area information obtaining part 22. Then, the determination processing part 23 determines the location and size of a blind spot area AB, based on the first area information and the second area information.

Figure 15:
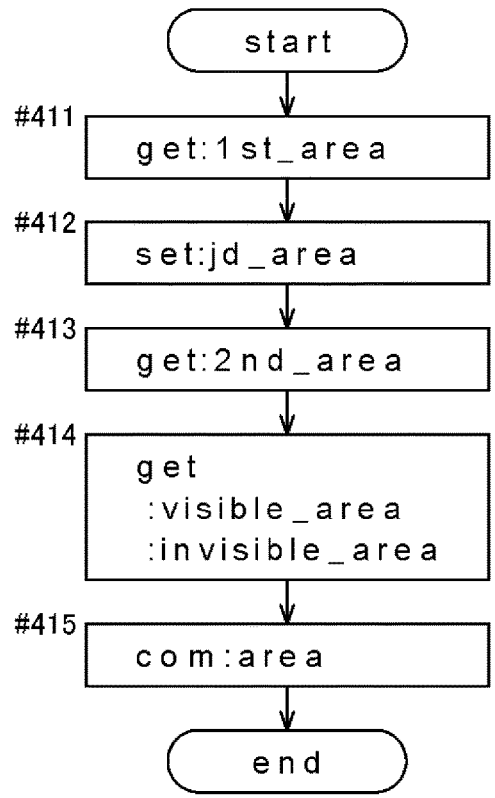
FIG. 15 is a flowchart showing a procedure for a case of calculating a blind spot area in the second embodiment.

The blind spot area determining part 20 configured in the above-described manner determines the location and size of a blind spot area AB, for example, according to a flowchart shown in FIG. 15. A procedure for determination of a blind spot area AB by the blind spot area determining part 20 will be described below with reference to FIG. 16 together with FIG. 15.

Figure 12:
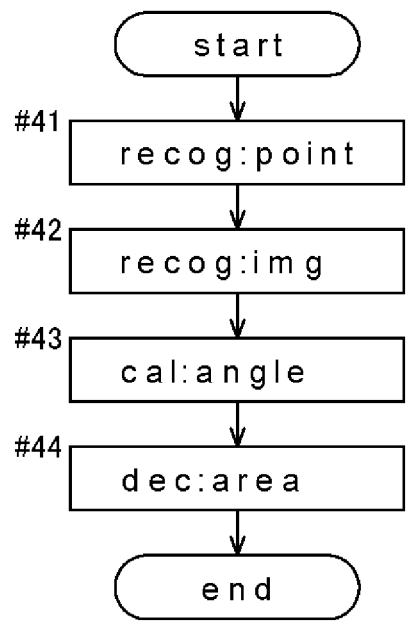
FIG. 12 is a flowchart showing a procedure for a case of calculating a blind spot area.
Figure 16:
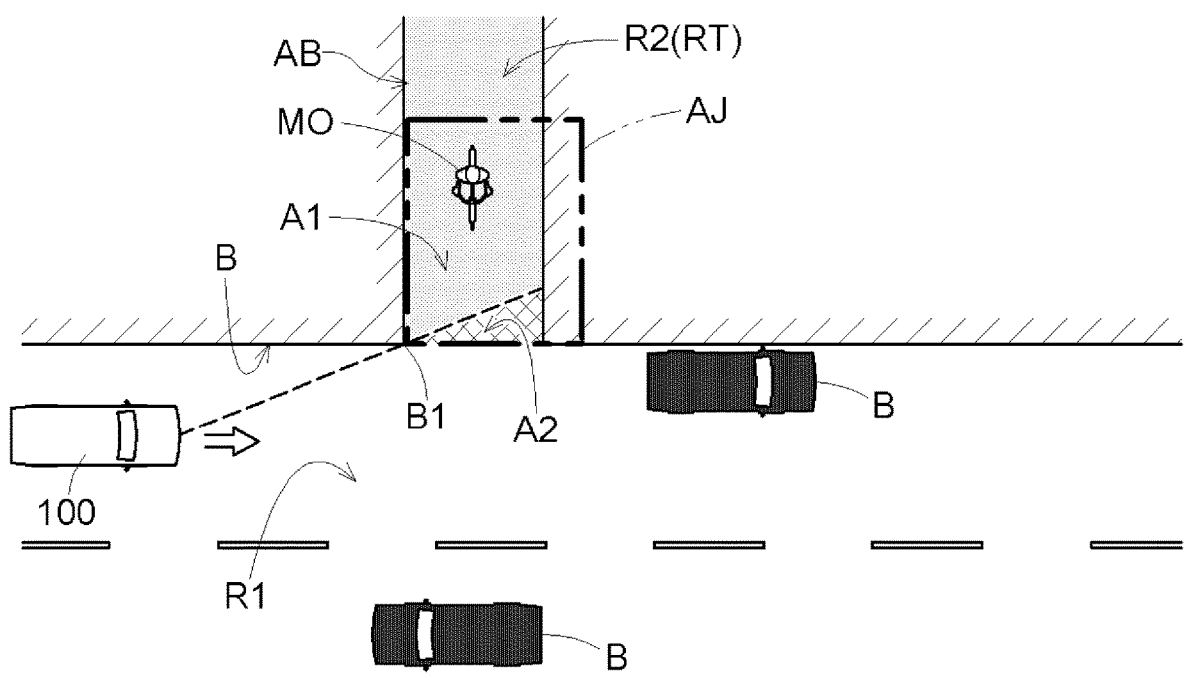
FIG. 16 is an illustrative diagram for a case of calculating a blind spot area in the second embodiment.

FIG. 15 is a flowchart showing a procedure for a case of calculating (determining) a blind spot area AB in the present embodiment, and shows another mode of the blind spot area calculating step #4 (see FIGS. 11 and 12). FIG. 16 is a plan view schematically showing an area around the vehicle 100, and is an illustrative diagram for a case of calculating a blind spot area AB using a blind spot area calculating step according to the present embodiment.

Upon calculation (determination) of a blind spot area AB, the blind spot area determining part 20 first obtains first area information (#411; a first area information obtaining step and a first area information obtaining function). At the first area information obtaining step #411, as described above, first area information about a target road RT present around a vehicle location is obtained from the current vehicle location (the location of the vehicle 100) detected by the sensor group 6 and road information stored in the database 7.

After the first area information obtaining step #411, the blind spot area determining part 20 sets a determination area AJ serving as a reference for determining a blind spot area AB (#412; a determination area setting step and a determination area setting function). At the determination area setting step #412, as shown in FIG. 16, a determination area AJ is set on a target road RT present around the location of the vehicle 100. Here, as described above, the target road RT refers to a road on which a blind spot area AB is formed, and in an example shown in the drawing, a jump-out route R2 with the possibility of a moving obstacle MO jumping out to a traveling route R1 of the vehicle 100 is the target road RT. Then, with the jump-out route R2 being the target road RT, the determination area AJ is set on the target road RT.

The determination area AJ is a plane area going along a road surface. In the present embodiment, the determination area AJ is set to a predefined size. In the example shown in the drawing, the determination area AJ is set with reference to an edge portion (hereinafter, referred to as a reference edge portion B1) of a front obstacle B (a wall B in the example shown in the drawing) that serves as a base point of creation of a blind spot area AB. The determination area AJ is set in a rectangular shape with the reference edge portion B1 being a vertex, and has a side portion extending along the traveling route R1 from the reference edge portion B1; and a side portion extending along the target road RT (jump-out route R2) from the reference edge portion B1. For example, the side portion extending along the traveling route R1 from the reference edge portion B1 is set to two to three meters on an actual scaling basis, and the side portion extending along the target road RT from the reference edge portion B1 is set to three to four meters on an actual scaling basis. Note, however, that these dimensions can be arbitrarily set, and the shape of the determination area AJ is not limited to a rectangular shape and may be a circular shape, a polygonal shape, etc. In addition, the determination area AJ does not need to be set in advance like the above description, and for example, a mode may be adopted in which the determination area AJ is set in a variable manner in accordance with the road width of the target road RT, etc. In this case, information such as road width is obtained from the database 7. Note that the above-described reference edge portion B1 can be a base point of creation of a blind spot area AB in the above-described first embodiment.

As shown in FIG. 15, after setting the determination area AJ (#412), the blind spot area determining part 20 obtains second area information (#413; a second area information obtaining step and a second area information obtaining function). As described above, at the second area information obtaining step #413, second area information is obtained based on a road surface area that can be recognized in a captured image which is captured by the front camera 1.

Figure 18:
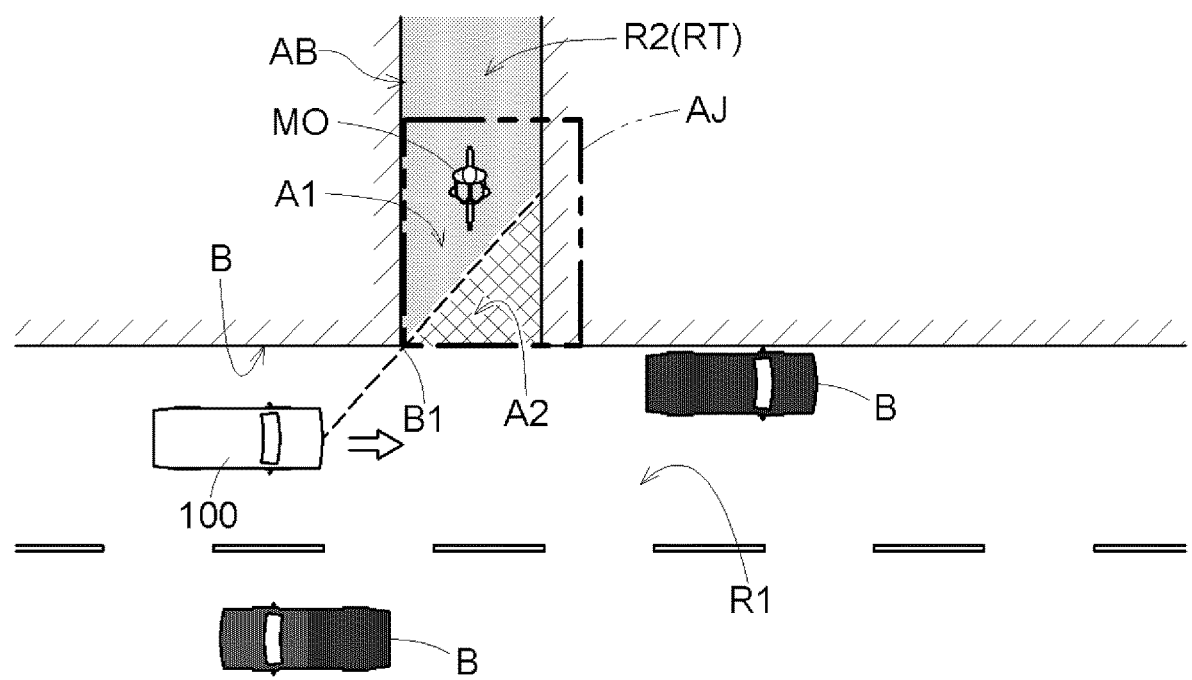
FIG. 18 is an illustrative diagram for a case of calculating a blind spot area in the second embodiment.

After the second area information obtaining step #413, the blind spot area determining part 20 extracts, in a range of the determination area AJ, an invisible area A1 that cannot be visually identified by the driver of the vehicle 100 (see FIGS. 16 and 18) and a visible area A2 that can be visually identified by the driver of the vehicle 100 (see FIGS. 16 and 18) (#414; an area extracting step and an area extraction function). Note that FIG. 18 is a diagram showing a later point in time than in FIG. 16 (e.g., a few seconds later). As described above, a road surface area indicated by second area information may be narrower than an ideal road surface area for when there is no front obstacle B which is indicated by first area information. When a road surface area of a target road RT (a road on which a blind spot area AB is formed) is included in the road surface area indicated by the second area information, the road surface area indicated by the second area information is, as a matter of course, narrower than the ideal road surface area indicated by the first area information. Hence, at the area extracting step #414, as shown in FIG. 16, an invisible area A1 and a visible area A2 are extracted in the range of the determination area AJ, based on an ideal road surface area indicated by the first area information and an actual road surface area (a road surface area that can be recognized in a captured image of the front camera 1) indicated by the second area information. As shown in the drawing, the invisible area A1 is a part of a blind spot area AB and is present within the range of the determination area AJ. The visible area A2 is a part of a road surface area that can be recognized in a captured image of the front camera 1, in other words, a road surface area that can be visually identified by the driver of the vehicle 100, and is present within the range of the determination area AJ.

After the area extracting step #414, the blind spot area determining part 20 compares the invisible area A1 with the visible area A2 (#415; an area comparing step and an area comparison function). The blind spot area determining part 20 determines the size and location of a blind spot area AB, based on the ratio of the invisible area A1 to the visible area A2. The blind spot area determining part 20 determines that the larger the invisible area A1 over the visible area A2, the larger the blind spot area AB, and determines that the smaller the invisible area A1 over the visible area A2, the smaller the blind spot area AB. In addition, as also shown in FIG. 16, for the positions of the invisible area A1 and the visible area A2 relative to the vehicle 100, the invisible area A1 is farther than the visible area A2. Therefore, the larger the visible area A2 over the invisible area A1, the invisible area A1 is placed on a farther side from the vehicle 100 by the visible area A2 (see FIG. 18). The blind spot area determining part 20 can thereby determine the location of the blind spot area AB (specifically, a boundary location between the invisible area A1 and the visible area A2).

Next, a display mode of an alert image MC displayed so as to be superimposed on a real view in the present embodiment will be described.

Figure 17:
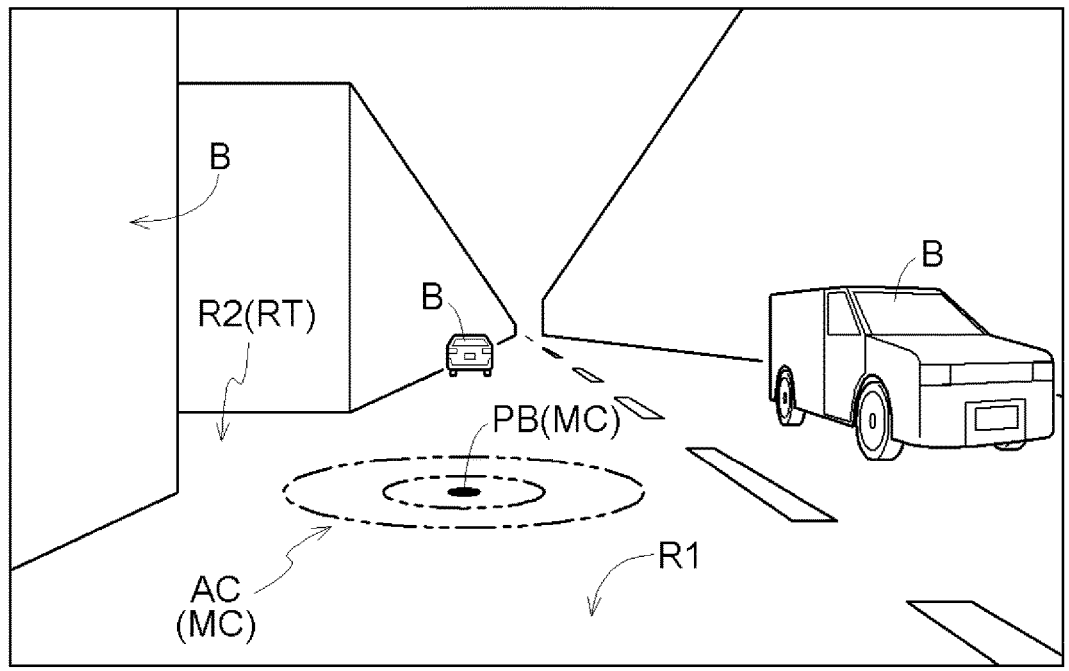
FIG. 17 is a diagram showing a state in which an alert image is superimposed on a real view in the second embodiment.

FIG. 17 shows an example in which an alert image MC is superimposed on the same real view as that of FIG. 16. As shown in FIGS. 16 and 17, in the present embodiment, a target point PB where the traveling of the vehicle 100 is likely to be influenced when there is a moving obstacle MO jumping out of the blind spot area AB is a point obtained with reference to a point of intersection of the jump-out route R2 of the moving obstacle MO and the traveling route R1 of the vehicle 100 on a travel lane of the vehicle 100. In the example shown in FIG. 17, the target point PB is set at a central position in a road width direction of the travel lane serving as the traveling route R1 of the vehicle 100. Note, however, that the configuration is not limited thereto, and the target point PB may be set at any location as long as the target point PB is set with reference to a point of intersection of the jump-out route R2 and the traveling route R1, and for example, the target point PB may be set on either left or right side in the road width direction of the travel lane serving as the traveling route R1 of the vehicle 100.

In the present embodiment, the vehicle drive assist system 10 changes an alert image MC, based on the size of a blind spot area AB determined by the determination processing part 23 (see FIG. 14). In the present embodiment, as in the above-described first embodiment, the alert image MC includes a target point PB and a display area AC spreading around from the target point PB.

Figure 19:
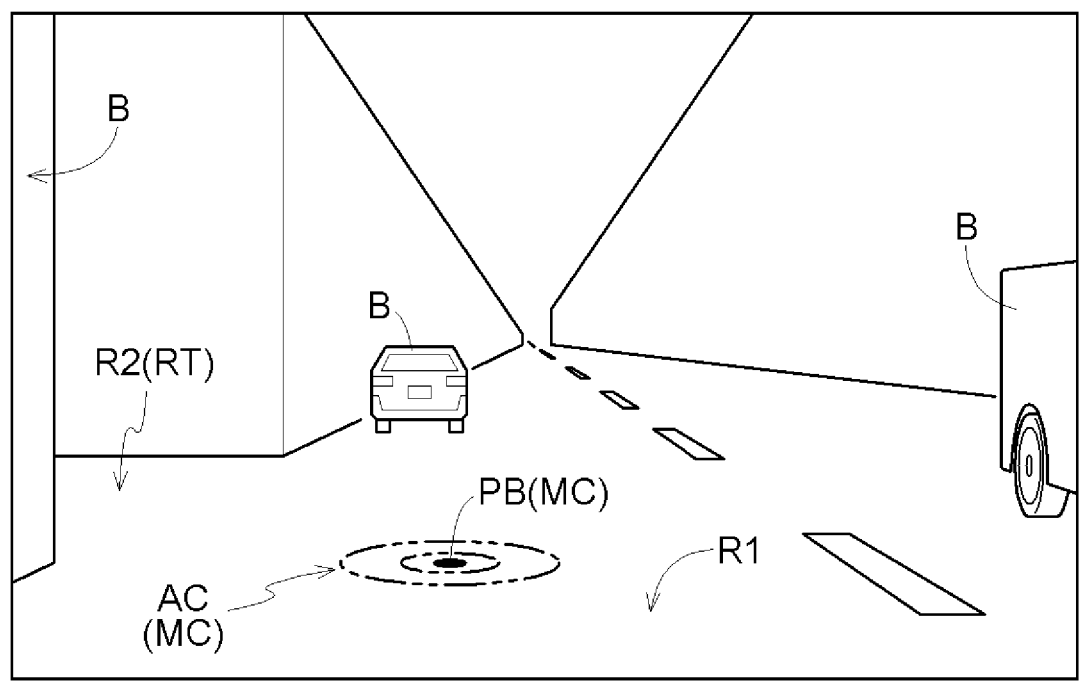
FIG. 19 is a diagram showing a state in which an alert image is superimposed on a real view in the second embodiment.

FIG. 18 shows a later point in time than in FIG. 16 (e.g., a few seconds later). FIG. 19 shows an example in which an alert image MC is superimposed on the same real view as that of FIG. 18. Namely, FIGS. 18 and 19 show a later point in time than in FIGS. 16 and 17 (e.g., a few seconds later).

As shown in FIG. 18, in a state later than a state shown in FIG. 16, by the vehicle 100 further approaching the target road RT, the visible area A2 increases and the invisible area A1 decreases. Therefore, it is determined that in the state shown in FIG. 18, the blind spot area AB is smaller (has changed) over the state shown in FIG. 16. As shown in FIG. 19, the vehicle drive assist system 10 displays the alert image MC in smaller size over the state shown in FIG. 18. Namely, in the present embodiment, the vehicle drive assist system 10 decreases the alert image MC as the blind spot area AB determined by the determination processing part 23 decreases. In other words, the vehicle drive assist system 10 increases the alert image MC as the blind spot area AB determined by the determination processing part 23 increases.

According to the vehicle drive assist systems 10 (including vehicle drive assist methods and vehicle drive assist programs) described in the above first and second embodiments, an alert image MC is displayed so as to be superimposed on a real view and so as to be appropriate to a blind spot area AB of the vehicle 100 which is created by a front obstacle B, and thus, for example, it is possible to appropriately call vehicle 100 driver's attention to the possibility of a moving obstacle MO such as a pedestrian, a bicycle, or another vehicle jumping out of a blind spot.

OTHER EMBODIMENTS

Next, other embodiments of a vehicle drive assist system, a vehicle drive assist method, or a vehicle drive program will be described.

(1) The above-described embodiments describe an example in which the size of a display area AC changes depending on the size of a blind spot area AB. However, the configuration is not limited to such an example, and the size of the display area AC may be fixed regardless of the size of the blind spot area AB. In addition, for example, the size of the display area AC varies depending on the size of the blind spot area AB that results from the size of a front obstacle B, but depending on the size of the blind spot area AB that changes depending on a relative positional relationship between the vehicle 100 and a target point PB, the size of the display area AC may be fixed without varying.

(2) The above-described first embodiment describes an example in which an alert image MC is displayed in a mode in which the attention call level X is shown in a stepwise manner. However, the configuration is not limited to such an example, and the alert image MC may be displayed in a mode in which the attention call level X is shown so as to continuously vary. For example, when the attention call level X is represented by colorations, the attention call level X may use a mode in which the attention call level X is continuously shown by gradation, etc.

(3) The above-described first embodiment describes a configuration in which the attention call level X increases as the possibility of a moving obstacle MO jumping out of a blind spot area AB increases, as an example in which the display mode of an alert image MC varies depending on a road environment in which the vehicle 100 travels. However, the configuration is not limited to such an example, and the configuration may be such that a coloration, a pattern, a shape, etc., change depending on the road environment, irrespective of the attention call level X. For example, the configuration may be such that the road environment is classified into four types: downtown areas, city areas, suburban areas, and automobile roads, and the coloration system varies depending on the road environment, e.g., downtown areas use a red system and city areas use a blue system, by which the driver of the vehicle 100 is aware of an environment in which he/she is traveling. In addition, the classification of the road environment is not limited thereto, either, and for example, the road environment may be classified by the number of intersections or curves based on map information, the number of obstacles based on captured information obtained by a camera, or the like. In addition, a display mode in which the alert image MC does not vary depending on the road environment may be adopted.

(4) The above-described first embodiment describes an example in which when the size of a front obstacle B is less than or equal to a preset threshold value T, an alert image MC is not displayed. However, the configuration is not limited to such an example, and alert images MC may be displayed for all front obstacles B recognized by the front camera 1.

(5) The above-described first embodiment describes an example in which in addition to an alert image MC, a recommended route image MR representing a recommended route which is a traveling route recommended for the vehicle 100 is displayed so as to be superimposed on a real view. However, without displaying the recommended route image MR, only the alert image MC may be displayed so as to be superimposed on the real view. Alternatively, even when the recommended route image MR is displayed, a recommended route that goes along a road alongside the road without going around target points PB of blind spot areas AB may be displayed.

(6) Although the above-described embodiments describe, as an example, a case in which a display area AC of an alert image MC has a circular shape with a target point PB being at the center, the shape of the display area AC is not limited thereto. For example, the shape of the display area AC may be an elliptical shape having a long axis going along a traveling direction of the vehicle 100, or an elliptical shape having a long axis going along a direction orthogonal to the traveling direction of the vehicle 100. Alternatively, the shape of the display area AC may be a polygonal shape such as a rectangular shape, a triangular shape, or a hexagonal shape.

(7) Although the above-described embodiments mainly describe a configuration in which a display area AC of an alert image MC has a planar shape going along the ground, the shape of the display area AC is not limited thereto. For example, the display area AC may have a three-dimensional shape that spreads out also in a height direction. For such a shape of the display area AC, for example, in addition to the above-described pyramidal shape, a circular cylindrical shape, a polygonal cylindrical shape, etc., may be used.

(8) The above-described second embodiment describes an example in which a determination area AJ serving as a criterion upon determining a blind spot area AB is set in a limited range on a target road RT. However, the configuration is not limited to such an example, and the determination area AJ may be set over the entire road surface area. Even in this case, an invisible area A1 and a visible area A2 are extracted in a range of the determination area AJ, based on first area information and second area information. Note that in this case, although the proportion occupied by the visible area A2 is sufficiently large compared to the proportion occupied by the invisible area A1, a determination of the location and size of a blind spot area AB can be made based on a successive change in the ratio of the visible area A2 to the invisible area A1.

(9) Note that it is also possible to apply a configuration disclosed in each of the above-described embodiments in combination with a configuration disclosed in another embodiment as long as a contradiction does not arise. For other configurations, too, the embodiments disclosed in this specification are to be considered in all respects as merely illustrative. Therefore, various modifications can be made as appropriate without departing from the true spirit and scope of the present disclosure.

SUMMARY OF THE ABOVE-DESCRIBED EMBODIMENTS

A summary of vehicle drive assist systems, vehicle drive assist methods, and vehicle drive assist programs described in the above description will be described below.

A vehicle drive assist system (10) includes:
  a display part (5) that displays an alert image (MC) superimposed on a real view; and
  a blind spot area determining part (20) that determines a blind spot area (AB), the blind spot area (AB) being an area that becomes a blind spot of a driver of a vehicle (100) due to a front obstacle (B) present on a front side in a traveling direction of the vehicle (100), and
  the display part (5) displays the alert image (MC) such that the alert image (MC) is superimposed on a target point (PB), the target point (PB) being a point where traveling of the vehicle (100) is likely to be influenced when there is a moving obstacle (MO) jumping out of the blind spot area (AB).

According to this configuration, an alert image (MC) is displayed so as to be superimposed on a real view and so as to be appropriate to a blind spot area (AB) of the vehicle (100) which is created by a front obstacle (B), and thus, for example, it is possible to appropriately call vehicle (100) driver's attention to the possibility of a moving obstacle (MO) such as a pedestrian, a bicycle, or another vehicle jumping out of a blind spot.

Here, it is preferable that the target point (PB) be a point obtained with reference to a point of intersection of a jump-out route (R2) of the moving obstacle (MO) and a traveling route (R1) of the vehicle (100) on a travel lane of the vehicle (100).

According to this configuration, a point where the traveling of the vehicle (100) is likely to be influenced is easily set as a target point (PB). Therefore, by displaying an alert image (MC) superimposed on such a target point (PB), driver's attention can be appropriately called.

In addition, it is preferable that the alert image (MC) be an image having an area including the target point (PB), and be displayed at least within a travel lane of the vehicle (100) in front in the traveling direction of the vehicle (100).

In an area within a travel lane in front in the traveling direction of the vehicle (100), the traveling of the vehicle (100) is likely to be influenced when there is a moving obstacle (MO). According to this configuration, an alert image (MC) having an area including a target point (PB) is displayed within such a travel lane, and thus, vehicle (100) driver's attention can be appropriately called.

In addition, it is preferable that a display area (AC) of the alert image (MC) on the real view decrease as the blind spot area (AB) decreases.

According to this configuration, in accordance with the size of a blind spot area (AB) of the vehicle (100) which is created by a front obstacle (B), a display area (AC) of an alert image (MC) is displayed in large size when the blind spot area (AB) is large, and the display area (AC) of the alert image (MC) is displayed in small size when the blind spot area (AB) is small. Therefore, vehicle (100) driver's attention can be appropriately called in accordance with the size of the blind spot area (AB) of the vehicle (100) which is created by the front obstacle (B).

In addition, it is preferable that a display area (AC) of the alert image (MC) on the real view decrease as the vehicle (100) approaches the blind spot area (AB).

According to this configuration, as the vehicle (100) approaches a blind spot area (AB), the blind spot area (AB) decreases and a display area (AC) of an alert image (MC) decreases. Conversely, as the vehicle (100) moves away from the blind spot area (AB), the blind spot area (AB) increases and the display area (AC) of the alert image (MC) increases. Namely, according to this configuration, the size of the display area (AC) of the alert image (MC) can be decided with reference to a distance between the vehicle (100) and the blind spot area (AB), and thus, a configuration in which the size of the display area (AC) of the alert image (MC) is variable can be comparatively easily implemented. In addition, since driver's visibility increases as the driver approaches the blind spot area (AB), by reducing the display area (AC) of the alert image (MC) in such a case, it can make the driver feel less annoyed.

In addition, it is preferable that the vehicle drive assist system further include an imaging part (1) that captures an image of an area on a front side in the traveling direction of the vehicle (100), and
  the blind spot area determining part (20) include:
    a first area information obtaining part (21) that obtains first area information, the first area information being information indicating an ideal road surface area of a target road (RT) for when the front obstacle (B) is not present, the target road (RT) being a road on which the blind spot area (AB) is formed;
    a second area information obtaining part (22) that obtains second area information, the second area information being information indicating a road surface area of the target road (RT), and being included in image information captured by the imaging part (1); and
    a determination processing part (23) that determines a location and a size of the blind spot area (AB), based on the first area information and the second area information.

A blind spot area (AB) is an area that cannot be seen by the driver, and thus, it is normally difficult to appropriately determine the size, etc., of the blind spot area (AB). According to this configuration, the determination of the blind spot area (AB) uses an ideal road surface area of a target road (RT) and a road surface area of the target road (RT) which is actually captured by the imaging part (1), by which it becomes possible to appropriately determine the location and size of the blind spot area (AB).

In addition, it is preferable that the alert image (MC) change based on the size of the blind spot area (AB) determined by the determination processing part (23).

According to this configuration, since an alert image (MC) changes depending on the size of a blind spot area (AB), the level of a call for driver's attention can be changed based on the change of the alert image (MC).

In addition, it is preferable that the alert image (MC) have a display area (AC) spreading around from a base point of creation (PB) of the blind spot area (AB).

According to this configuration, vehicle (100) driver's attention can be appropriately called to a base point of creation (PB) of a blind spot area (AB) and an area therearound.

In addition, it is preferable that the blind spot area determining part (20) determine a size of the blind spot area (AB), based on an angle, in a planar view, of the blind spot area (AB) spreading out behind the front obstacle (B) as viewed from the driver, with a base point of creation (PB) of the blind spot area (AB) being at a center.

According to this configuration, the size of a blind spot area (AB) can be appropriately determined in line with the actual situation. By this, the size of a display area (AC) is comparatively easily changed based on the size of the blind spot area (AB).

In addition, it is preferable that the alert image (MC) be displayed in a mode in which an attention call level (X) is shown in a stepwise manner, the attention call level (X) representing a level of a call for vehicle (100)'s attention.

For example, reaction time allowed to react to a sudden jump out of a moving obstacle (MO) such as a pedestrian is short at a location near a base point of creation (PB) of a blind spot area (AB) in a driver's visually identifiable range, and thus, there is a high necessity of attention call. On the other hand, the above-described reaction time is long, for example, at a location far from the base point of creation (PB) of the blind spot area (AB), and thus, the necessity of attention call is relatively low. According to this configuration, since the attention call level (X) representing the level of a call for vehicle (100)'s attention is shown in a stepwise manner, it becomes possible to appropriately call driver's attention based on the level of necessity.

In addition, it is preferable that a display mode of the alert image (MC) vary depending on a road environment in which the vehicle (100) travels.

Depending on a road environment in which the vehicle (100) travels, the possibility of a moving obstacle (MO) such as a pedestrian jumping out of a blind spot area (AB) varies. For example, if the level, frequency, etc., of a call for driver's attention are increased in a road environment with a low likelihood of a moving obstacle (MO) such as a pedestrian jumping out, e.g., an automobile road, then the driver feels annoyed. On the other hand, for example, in a road environment with a high likelihood of a moving obstacle (MO) such as a pedestrian jumping out, e.g., a downtown area, it is often appropriate to increase the level, frequency, etc., of a call for driver's attention. According to this configuration, the display mode of an alert image (MC) varies depending on a road environment in which the vehicle (100) travels, and thus, vehicle (100) driver's attention can be more appropriately called.

In addition, it is preferable that when a size of the front obstacle (B) is less than or equal to a preset threshold value (T), the display part (5) not display the alert image (MC).

Depending on the size of a front obstacle (B), the size of a blind spot area (AB) created by the front obstacle (B) may be so small that there is no need to consider the presence of a moving obstacle (MO) such as a pedestrian hidden in the blind spot area (AB). If an alert image (MC) is displayed so as to be superimposed on a real view even in such a case, then the driver feels annoyed. According to this configuration, an alert image (MC) can be displayed only for a front obstacle (B) with a size for which the alert image (MC) should be displayed, and thus, vehicle (100) driver's attention can be more appropriately called.

In addition, it is preferable that the display part (5) further display a recommended route image (MR) superimposed on the real view, the recommended route image (MR) representing a recommended route, the recommended route being a traveling route recommended for the vehicle (100), and the recommended route image (MR) be displayed so as to go around the target point (PB).

According to this configuration, driver's attention can be appropriately called to a blind spot area (AB) of the vehicle (100) created by a front obstacle (B), and the driver can be presented with a recommended route in which the vehicle (100) travels while going around a point with a high likelihood of a moving obstacle (B) such as a pedestrian jumping out of the blind spot area (AB). By this, information contributing to safe driving of the vehicle (100) can be provided to the driver.

Various technical features of the above-described vehicle drive assist system are also applicable to a vehicle drive assist method and a vehicle drive assist program. For example, the vehicle drive assist method can be a method having the features of the above-described vehicle drive assist system. In addition, the vehicle drive assist program can cause a computer to implement functions corresponding to the features of the above-described vehicle drive assist system. As a matter of course, these vehicle drive assist method and vehicle drive assist program can also provide the functions and effects of the above-described vehicle drive assist system. Furthermore, various additional features exemplified as preferred modes of the vehicle drive assist system can also be incorporated into these vehicle drive assist method and vehicle drive assist program, and the method and the program can also provide functions and effects corresponding to the additional features.

Such a vehicle drive assist method includes:

a blind spot area determining step (#4) of determining a blind spot area (AB) by a determining part, the blind spot area (AB) being an area that becomes a blind spot of a driver of a vehicle (100) due to a front obstacle (B) present on a front side in a traveling direction of the vehicle (100); and an alert image displaying step (#6) of allowing a display part (5) to display an alert image (MC) superimposed on a real view such that the alert image (MC) is superimposed on a target point (PB), the target point (PB) being a point where traveling of the vehicle (100) is likely to be influenced when there is a moving obstacle (MO) jumping out of the blind spot area (AB).

In addition, such a vehicle drive assist program causes a computer to implement:

a blind spot area determination function (#4) of determining a blind spot area (AB), the blind spot area (AB) being an area that becomes a blind spot of a driver of a vehicle (100) due to a front obstacle (B) present on a front side in a traveling direction of the vehicle (100); and an alert image display function (#6) of allowing a display part (5) to display an alert image (MC) superimposed on a real view such that the alert image (MC) is superimposed on a target point (PB), the target point (PB) being a point where traveling of the vehicle (100) is likely to be influenced when there is a moving obstacle (MO) jumping out of the blind spot area (AB).

The invention claimed is:

1. A vehicle drive assist system comprising:
a processor programmed to:
- capture an image of an area on a front side in a traveling direction of a vehicle;
- determine a blind spot area, the blind spot area being an area that becomes a blind spot of a driver of the vehicle due to a front obstacle present on the front side in the traveling direction of the vehicle, the blind spot area being determined by:
  - setting a determination area, which is a predetermined area of a surface of a road intersecting a road on which the vehicle is traveling, a corner of the predetermined area being defined by a point on a surface of the road on which the vehicle is traveling and an edge portion of the front obstacle;
  - obtaining information of a first area, which is a road surface area of the road intersecting the road on that the vehicle is traveling within the determination area;
  - determining a second area, which is a road surface area of only a part of the road intersecting the road on which the vehicle is traveling that is visible within the captured image; and
  - calculating the blind spot area by subtracting the second area from the first area; and
- display an alert image superimposed on a real view on a display by:
  - setting a size of the alert image based on the calculated blind spot area;
  - setting a target point at a point where traveling of the vehicle is likely to be influenced when there is a moving obstacle jumping out of the blind spot area; and
- superimpose the alert image on the target point.

2. The vehicle drive assist system according to claim 1, wherein the target point is a point obtained with reference to a point of intersection of a jump-out route of the moving obstacle and a traveling route of the vehicle on a travel lane of the vehicle.

3. The vehicle drive assist system according to claim 1, wherein the alert image is an image having an area including the target point, and is displayed at least within a travel lane of the vehicle in front in the traveling direction of the vehicle.

4. The vehicle drive assist system according to claim 1, wherein a display area of the alert image on the real view decreases as the blind spot area decreases.

5. The vehicle drive assist system according to claim 1, wherein a display area of the alert image on the real view decreases as the vehicle approaches the blind spot area.

6. The vehicle drive assist system according to claim 1, wherein the alert image changes based on the size of the determined blind spot area.

7. The vehicle drive assist system according to claim 1, wherein the alert image has a display area spreading around from a base point of creation of the blind spot area.

8. The vehicle drive assist system according to claim 1, wherein the alert image is displayed in a mode in which an attention call level is shown in a stepwise manner, the attention call level representing a level of a call for vehicle's attention.

9. The vehicle drive assist system according to claim 1, wherein a display mode of the alert image varies depending on a road environment in which the vehicle travels.

10. The vehicle drive assist system according to claim 1, wherein when a size of the front obstacle is less than or equal to a preset threshold value, the alert image is not displayed.

11. The vehicle drive assist system according to claim 1, wherein
the processor is programmed to display a recommended route image superimposed on the real view, the recommended route image representing a recommended route, the recommended route being a traveling route recommended for the vehicle; and
the recommended route image is displayed so as to go around the target point.

12. A vehicle drive assist method comprising:
- capturing an image of an area on a front side in a traveling direction of a vehicle;
- determining a blind spot area, the blind spot area being an area that becomes a blind spot of a driver of the vehicle due to a front obstacle present on the front side in a traveling direction of the vehicle, the blind spot area being determined by:
  - setting a determination area, which is a predetermined area of a surface of a road intersecting a road on which the vehicle is traveling, a corner of the predetermined area being defined by a point on a surface of the road on which the vehicle is traveling and an edge portion of the front obstacle;
  - obtaining information of a first area, which is a road surface area of the road intersecting the road on that the vehicle is traveling within the determination area;
  - determining a second area, which is a road surface area of only a part of the road intersecting the road on which the vehicle is traveling that is visible within the captured image; and
  - calculating the blind spot area by subtracting the second area from the first area; and
- displaying an alert image superimposed on a real view on a display by:
  - setting a size of the alert image based on the calculated blind spot area;
  - setting a target point at a point where traveling of the vehicle is likely to be influenced when there is a moving obstacle jumping out of the blind spot area; and
- superimposed superimposing the alert image on the target point.

13. A computer-readable storage medium storing a computer-executable vehicle drive assist program that causes a computer to perform functions, comprising:
- capturing an image of an area on a front side in a traveling direction of a vehicle;
- determining a blind spot area, the blind spot area being an area that becomes a blind spot of a driver of the vehicle due to a front obstacle present on the front side in the traveling direction of the vehicle, the blind spot area being determined by:
  - setting a determination area, which is a predetermined area of a surface of a road intersecting a road on which the vehicle is traveling, a corner of the predetermined area being defined by a point on a surface of the road on which the vehicle is traveling and an edge portion of the front obstacle;

obtaining information of a first area, which is a road surface area of the road intersecting the road on that the vehicle is traveling within the determination area;

determining a second area, which is a road surface area of only a part of the road intersecting the road on which the vehicle is traveling that is visible within the captured image; and calculating the blind spot area by subtracting the second area from the first area; and displaying an alert image superimposed on a real view on a display by:

setting a size of the alert image based on the calculated blind spot area;

setting a target point at a point where traveling of the vehicle is likely to be influenced when there is a moving obstacle jumping out of the blind spot area; and superimposing the alert image on the target point.

\* \* \* \* \*